United States Patent
Sherlock

(10) Patent No.: US 10,740,233 B2
(45) Date of Patent: Aug. 11, 2020

(54) MANAGING CACHE OPERATIONS USING EPOCHS

(71) Applicant: HEWLETT PACKARD ENTERPRISE DEVELOPMENT LP, Houston, TX (US)

(72) Inventor: Derek Alan Sherlock, Boulder, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/768,557

(22) PCT Filed: Oct. 30, 2015

(86) PCT No.: PCT/US2015/058266
§ 371 (c)(1),
(2) Date: Apr. 15, 2018

(87) PCT Pub. No.: WO2017/074416
PCT Pub. Date: May 4, 2017

(65) Prior Publication Data
US 2018/0307601 A1  Oct. 25, 2018

(51) Int. Cl.
G06F 12/00 (2006.01)
*G06F 12/0804* (2016.01)
*G06F 12/126* (2016.01)

(52) U.S. Cl.
CPC ........ *G06F 12/0804* (2013.01); *G06F 12/126* (2013.01); *G06F 2212/1032* (2013.01)

(58) Field of Classification Search
CPC .......................... G06F 12/126; G06F 12/0804
See application file for complete search history.

(56) References Cited

U.S. PATENT DOCUMENTS

| 8,543,766 | B2 | 9/2013 | Grayson et al. |
| 2005/0138283 | A1 | 6/2005 | Garney |
| 2008/0005465 | A1 | 1/2008 | Matthews |
| 2010/0169392 | A1 | 7/2010 | Lev Ran et al. |
| 2014/0006701 | A1 | 1/2014 | Condit et al. |
| 2014/0201467 | A1 | 7/2014 | Blaner et al. |

(Continued)

FOREIGN PATENT DOCUMENTS

| WO | WO-2010144947 A1 | 6/2001 |
| WO | WO-2010088608 A2 | 8/2010 |

OTHER PUBLICATIONS

Martin Schulz, "Local Relaxed Consistency Schemes on Shared-memory Clusters," School Electrical and Computer Engineering, Apr. 2003, 7 pages.

(Continued)

*Primary Examiner* — Baboucarr Faal
(74) *Attorney, Agent, or Firm* — Park, Vaughan, Fleming & Dowler LLP

(57) ABSTRACT

According to an example, cache operations may be managed by detecting that a cacheline in a cache is being dirtied, determining a current epoch number, in which the current epoch number is associated with a store operation and wherein the epoch number is incremented each time a thread of execution completes a flush-barrier checkpoint, and inserting an association of the cacheline to the current epoch number into a field of the cacheline that is being dirtied.

20 Claims, 5 Drawing Sheets

(56) References Cited

U.S. PATENT DOCUMENTS

2016/0011992 A1* 1/2016 Sandoz ................ G06F 3/0622
  711/163
2016/0283157 A1* 9/2016 Kanai ................... G06F 3/0679

OTHER PUBLICATIONS

PCT/ISA/KR, International Search Report and Written Opinion, dated Jul. 20, 2017, PCT/US2015/058266, 12 pages.
Thomas J. Ashby, "Software-based Cache Coherence with Hardware-assisted Selective Self-invalidations Using Bloom Filters," IEEE Transactions on Computers, Apr. 2011, 12 pps.

* cited by examiner

MANAGING CACHE OPERATIONS USING EPOCHS

BACKGROUND

Computer systems typically include a central processing unit (CPU) and a main memory. The speed at which the CPU decodes and executes instructions to process data typically exceeds the speed at which instructions and operands are transferred between the main memory and the CPU. In an attempt to reduce the problems caused by this mismatch, computers typically implement a cache, which are employed to temporarily hold those portions of the contents of the main memory that are believed to be currently in use by the CPU. The main purpose of caches is to shorten the time necessary to perform memory accesses, either for data or instruction fetch because information located in caches may be accessed in much less time than that located in the main memory.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
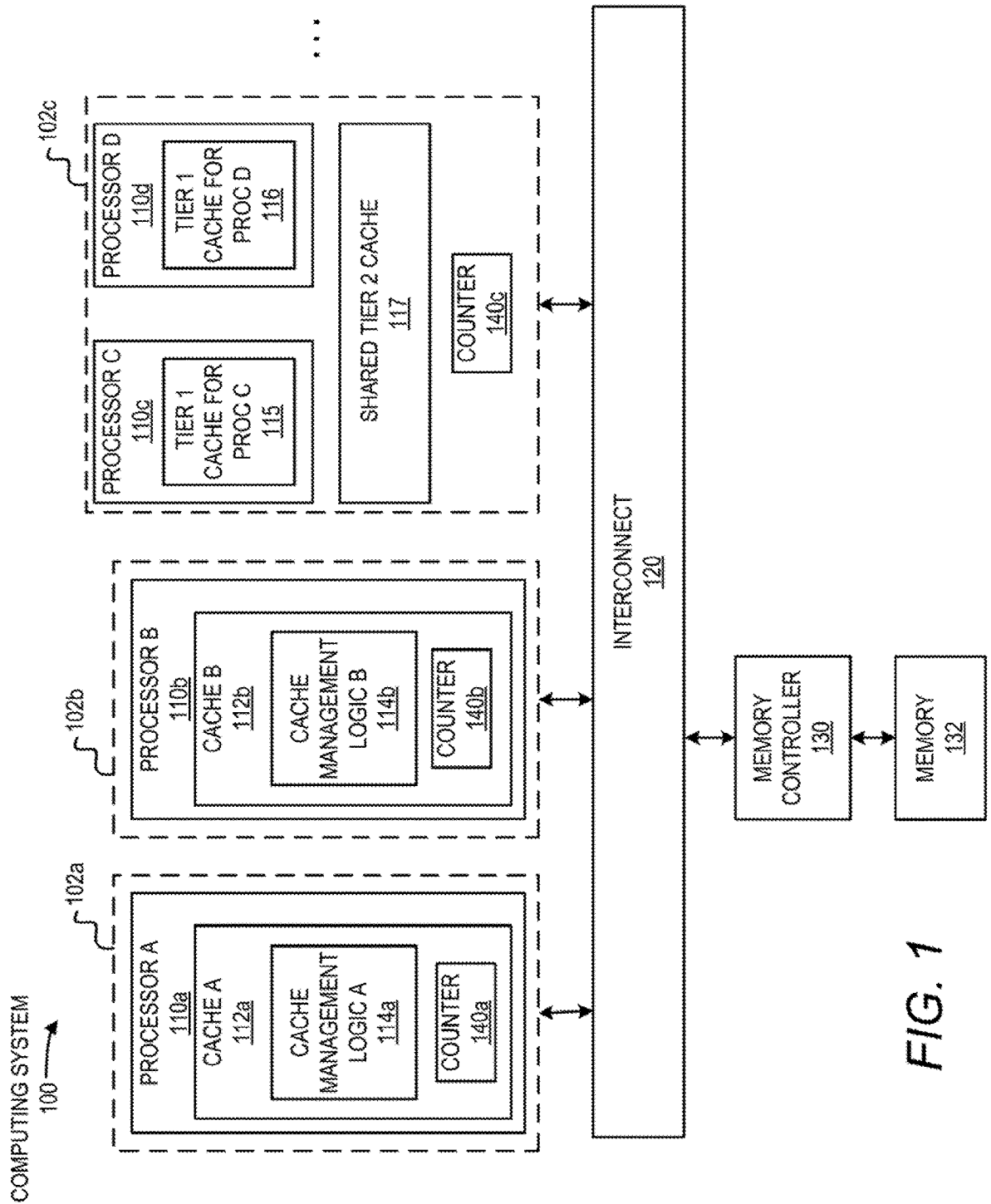
FIG. 1 shows a simplified block diagram of a computing system on which features of the methods and apparatuses disclosed herein may be implemented, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Additionally, It should be understood that the elements depicted in the accompanying figures may include additional components and that some of the components described in those figures may be removed and/or modified without departing from scopes of the elements disclosed herein. It should also be understood that the elements depicted in the figures may not be drawn to scale and thus, the elements may have different sizes and/or configurations other than as shown in the figures.

The following two examples illustrate cases where write-back caching by central processing units (CPUs) provides correct and consistent ordering semantics for volatile memory data in traditional symmetrical multiprocessing (SMP). These examples also show, however, that traditional SMP does not adequately meet the needs of load/store-accessible non-volatile memory, or of non-coherently-shared memory.

Example 1: Non-Volatile Load/Store-Accessed Memory

A direct load/store access model may be used in computer architectures for non-volatile memory, in which the direct load/store access to non-volatile memory may allow data structures to be directly manipulated in-place, e.g., where the data structures are persistently stored. The use of direct load/store access models may eliminate many of the performance and energy overheads associated with more traditional storage direct memory access (DMA)/Input-Output (IO)-based block storage models, such as moving data between persistent and volatile media, manipulating entire blocks rather than only the affected data, incurring processor privilege escalation overheads when an unprivileged application reads or writes storage, etc.

Most modern central processing units (CPUs) implement write-back caching of data, typically using the MESI protocol, or a derivative cache protocol such as MOESI, MESIF, MOSI, MSI, etc. These protocols have evolved around volatile memory and present some difficulties when used in conjunction with load/store-accessed non-volatile memory. In one regard, therefore, most modern CPU cache designs have not caught up with the needs of new direct load/store access models in non-volatile memory.

When a CPU executes a store instruction, the CPU is modifying the contents of the memory image as seen by the processing threads in the CPU's coherency domain. Because the CPU cache acts as an extension of the memory, execution of store instructions immediately modify the cache contents, but only eventually flush these changes back to memory. Even in cache-coherent multi-processor environments, at times when the ordering rules call for a store to be made visible to all processors, the store is still only immediately completed to the cache. Eventual write-back of the modified data from cache to memory may safely be deferred because the coherency protocol ensures timely visibility of modified cachelines by other processors.

Example 2: Volatile or Non-Volatile Memory that is Shared Between CPUs without Hardware Coherency In large scale computer systems with many CPUs and a large pool of load/store-accessed shared memory, the memory may be shared by creating a single, large coherency domain. In the large coherency domain, any CPU may always see the latest stored value, even if that modified data resides in another CPU's cache. However, large coherency domains are costly in terms of performance, power, and component cost, because large coherency domains require the broadcasting of many snoop messages to many caches, or a home agent featuring a coherent directory, or both. Also, large coherency domains typically require a relatively complex hardware protocol for handling conflicts.

For relatively small coherency domains, the costs in performance, power, and components are typically relatively low because of the low number of participating devices, such as CPUs and memory devices, and small physical distances between the CPUs and memory devices. Larger coherency domains often suffer disproportionately because of poor scaling from the combined effects of long flight times due to greater physical distances and larger directory overheads and greater snoop fan-outs due to larger numbers of caches.

Thus, a large system may instead be designed to have many smaller coherency domains, rather than one single large coherency domain to keep costs down, while maintaining a shared memory pool between these domains, with no inter-domain hardware coherency enforcement. In these types of designs, programs that run entirely within a single small coherency domain may still benefit from hardware-enforced cache coherency, while programs that run across multiple coherency domains may require software to implement cache coherency on behalf of shared data structures by using explicit flush instructions, and if necessary, barrier instructions. This sort of "software-enforced coherency" may still suffer from performance and power costs, but these costs may be relatively small compared to the costs of hardware-enforced single-coherency-domain approach because these costs may need only be applied selectively, only when needed by the application's data sharing model. Another cost of the software-enforced coherency approach is the extra programming complexity required to implement this approach. However, these costs are only incurred for those programs that access data from CPUs spanning coherency domains; whereas the costs of a large hardware-enforced coherency domain are ever-present.

Common Elements Between Example 1 and Example 2

Both Example 1 and Example 2 discussed above may apply to an architecture that employs load/store accessible non-volatile memory, and makes this memory accessible to many CPUs spanning many coherency domains. Individual reads or writes from different CPUs may reach this memory with no particular coordination by the hardware. Without the right precautions, however one CPU may rely on a stale cache of data that has since been modified by a store from another CPU, or a CPU may rely on non-volatile data that is left in an inconsistent state due to an earlier interruption (e.g. power failure) that occurred while some caches were dirty.

In Example 1, the effects of stores by one CPU may not become persistent in non-volatile memory immediately, even though the effects are immediately visible to other threads of execution within the same coherency domain. In Example 2, the effects of stores by one CPU may not become visible immediately to all other CPUs in other coherency domains, even though they are immediately visible to other execution threads within the same coherency domain.

What Example 1 and Example 2 have in common is that software has to, when necessary, explicitly control the consistency of data structures that are modified in the shared memory or the non-volatile memory. The following example is provided to illustrate this requirement. Because of write-back caching (such as MESI) in the CPUs, the order in which the writes are made persistent in memory and visible between distinct coherency domains is not the same as the order in which the corresponding stores become visible within the coherency domain containing the CPU where the store instruction was executed. In terms of visibility within the coherency domain, a processor's instruction set may provide a guarantee that the results of store A followed by store B will become visible in that exact order, as seen by any other executing thread on any other processor in the same cache coherency domain. Depending upon the processor architecture, this may be an inherent ordering guarantee that always applies, or this may require the use of an explicit "memory barrier" instruction between the store A and store B instructions in those cases where the programmer cares about that ordering. Either way, the program may rely on this visibility-related behavior within a coherency domain, for example, consider a binary-tree structure: store A may insert data into a newly-created B-tree node, and store B may link that node into an already-in-use B-tree data structure. Any other thread within the coherency domain, examining the tree concurrently, will either see the new node as present and valid (both stores already visible), or as absent (store B not yet visible). From the viewpoint of another thread in the same coherency domain, the data structure is always in a legal, consistent state. The data structure never, even transiently, enters a state where the data is present (store B is already visible) but invalid (store A not yet visible).

Still only considering operation within a single coherency domain, a "memory barrier" requirement is said to exist between the group of earlier stores and the execution of some subsequent code, if there is a requirement that the subsequent code may not begin to execute until all of the stores are known to be visible to all threads of execution in the coherency domain. The group of stores may be termed the "barriers store set," and the code that must not execute prematurely may be termed the "dependent code." Most CPU instruction sets implement memory barrier instructions to guarantee this required behavior. A few instruction sets implement "strict ordering" rules, which are equivalent to the implicit inclusion of a memory barrier instruction between successive store instructions.

As used herein, a "flush barrier" is defined to be similar to a memory barrier, except subject to a stronger dependency requirement. Under a flush barrier requirement, the dependent code must not begin to execute until all of the stores in the store set are not only visible to all threads within the coherency domain, but also committed to the physical memory devices and visible to all threads running in other coherency domains sharing that memory. Since MESI-cached memory generally interacts with memory whole cachelines at a time, the set of cachelines that must be written to memory to satisfy this dependency consists of all cachelines that have been modified, in whole or in part, by any of the stores in the store set. As used herein, the set of cachelines that must be written to satisfy this dependency may be termed the barrier's "cache footprint." It should be noted that the use of a CPU instruction set's memory barrier instruction following one or more store instructions may satisfy a memory barrier requirement, but does not on its own satisfy a flush barrier requirement. In many CPU architectures a flush barrier requirement may be satisfied by issuing an explicit cache flush instruction following the relevant stores, and following the flushes by a memory barrier instruction.

The operation above also assumes that the CPU, in concert with any external logic interfacing the CPU to the memory, is designed such that the flush instruction is not considered to be complete until data has been committed to memory. This last requirement is sometimes described as a "non-posted write" requirement. The store operations making up the barrier store set may occur spread out over a period of time. For example, the store operations may be accumulating data received from multiple network packets, or accumulating data passed to a storage driver by multiple operating system calls. The store operations may have good or bad temporal and spatial locality relative to each other. Also, it should be noted that the dependent code may not necessarily consist of stores to memory, as it did in the example above. For example, if the barrier store consists of stores that update a bank ledger, the dependent code may notify the customer that a money transfer has occurred, via a network channel. As used herein, the term "flush checkpoint" may describe the moment in time when a particular flush barrier's cache footprint must be committed to memory in order to enable further forward progress on executing code that would otherwise be blocked, for example, the earliest moment when the store B in the earlier example may be executed.

The following example is provided to further illustrate why a memory barrier is not the same as a flush barrier. In the store A, store B example above, with a memory barrier instruction, the stores are guaranteed to become visible in the coherency domain in that order: store A first, and store B afterwards. However, the state of the actual stored data in the memory devices, rather than the caches, may differ. Both stores initially only affect stored values in the CPU caches. Now, taking the example that the cacheline modified by store B is written to memory first, while the cacheline modified by store A remains modified in the cache. The write to memory of the cacheline modified by store B to memory may occur for many reasons, e.g., the cacheline modified by store B may be evicted to make room in the cache, the cacheline modified by store B may be snooped by another cache, resulting in an incidental write back to memory because another processor reads it, or the cacheline modified by store B may be snooped or explicitly flushed as a side-effect of false-sharing, i.e., as a consequence of operations by the same or another thread or processor acting on another unrelated data item that happens to share the same cacheline. Regardless of the cause, the persistent state in memory is, at least temporarily, inconsistent, even though the inconsistency is not visible to any of the executing threads in the coherency domain. In the B-tree example above, the B-tree data structure stored in memory has the new node present (store B is persistent), but not yet valid (store A is not yet persistent). Thus, the memory contains a stored state which is considered illegal, even though that illegal state is never visible within the storing CPU's coherency domain, and thus would not present any problems in a classic coherently-shared volatile memory architecture.

In the discussions above, two examples are described in which it would be desirable to ensure that the state of data stored in memory, rather than just the cache state, should at all times be legal and consistent. In both of these examples, the memory image may be kept consistent and legal at all times through the use of explicit software behavior. Just as with coherent sharing, synchronization techniques may be required to guard write access to shared data. Additional behaviors and precautions may be needed whenever memory is shared non-coherently, or used as direct load/store-accessed non-volatile storage. For example, cachelines may have to be purged or flushed before they are read by a CPU thread to ensure that stale data (e.g., from earlier prefetching) is not consumed. Even false-sharing in the placement of data may result in corruption if it results in multiple CPU caches holding the same line exclusive or modified at the same time.

Software may be used to maintain coherency of data even across independent coherency domains through the use of explicit cache management instructions. Use of software in this manner in a completely general sense may be cumbersome to implement, however, software may be designed to selectively apply these techniques only in cases where maintaining coherency of data matters. For example, no particular precautions may be needed for data that is neither shared nor persistent, for example a single thread's non-shared local variables, or subroutine return stack. As another example, coherency may not need to be maintained if the data is shared or persistent but there is no expectation of instantaneous consistency, for example the data within an "eventual consistency" database transaction that is being generated by a single CPU, but is not yet ready to be committed. As a further example, coherency may not need to be maintained for data that is fundamentally unimportant, for example, the content of memory that is currently in a free pool.

Software may be used to pick and choose only the data structures and times when cache consistency matters, and to take the required precautions in those cases only. In these instances, consistency may mean both consistency as seen by other threads running in other coherency domains as well as consistency as seen by future users of the stored non-volatile data in the event further writes fail to complete, e.g., due to a system interruption. One subtle distinction exists between the needs of Example 1 and Example 2 discussed above. In Example 2, shared data must be loaded into cachelines that are first purged from the CPU's cache. This may be necessary so that the CPU will see the latest changes written and flushed by other CPUs in different coherency domains. In Example 1, however, since a single coherency domain is described, this pre-flushing before reading is not required. Other aspects of the software approach may still be needed, namely the explicit flushing of modified cachelines, and any fencing or barrier operations necessary to wait for commitment to memory before proceeding with further stores that must remain ordered relative to earlier ones.

Alternatives exist to the use of explicit flushes/purges described above to maintain a consistent image in shared memory or in non-volatile memory. One alternative is to configure the memory interface to use write-through caching instead of writeback, or, to use a non-cacheable region for non-volatile or non-coherently-shared memory. Both of these methods may be effective, but significantly lower the performance and increase the energy consumption by eliminating the performance and power benefits of write-back caching.

Another alternative is to implement logic external to the CPU that snoops modified data out of the CPU and commits it to memory in response to some sort of programmatic control by the CPU, e.g., through descriptors stored in memory, or non-cached control registers. The loads or stores that access the descriptors or registers may indicate the completion status of a requested flush, and with suitable barrier or fence instructions, may be used to ensure the commitment to memory of the store A before the store B is attempted in the earlier example. In general, this approach has little to offer over and above the simpler explicit flush instruction method, other than that the external hardware may be given some knowledge about the pattern of locations needing to be flushed, so that a single operation may flush for example an entire page, or some specific data structure.

The approaches discussed above either require detailed accounting of store addresses on the part of software, or they create on overhead of unnecessary extra loads and stores. For instance, in the store A followed by store B example discussed earlier, "store A" represented the creation of a new node in a data structure. In an example, "store A" may not actually be just a single store. For example, "A" may represent a complex data sub-structure, which B then commits by splicing the data sub-structure into a live data structure, or otherwise flagging the "A" data as ready for consumption. "A" may also be built over a considerable period of time, e.g., because the data sub-structure is a collection of data from asynchronously-arriving network packets. If the data structure is a filesystem, "A" may include many scattered filesystem data block modifications, created in stages by several disjoint file write( ) operating system calls, and eventually synchronously committed, for example with a sync( ) operating system call that commits the modified data by means of a metadata update (the store B).

Possible Software Approaches Using Explicit Cache Flush Instructions:

Accounting method: Software may keep a detailed list of all modified cachelines associated with each checkpoint that may occur. In the simple store A, store B example this may be trivial. However, a complex example, such as a filesystem driver, may have many open files and no advanced knowledge of when nor in which order each file will be closed or synced. A detailed accounting may be needed of all of the modified cachelines in each open file so that the appropriate ones may be flushed when a particular file needs to be synced. Creating and maintaining this accounting in software may be a costly overhead because it is extra code and extra storage that exists purely to manage caches.

Immediate flush method: A simplifying approach may be to immediately follow every write that forms part of any checkpoint with an immediate cacheline flush, which in effect is similar to having the software mimic the behavior of a write-through cache. This may simplify software, e.g., saves a large amount of accounting because a list of modified cachelines need not be stored. However, the immediate flush method may incur significant cost in terms of power and performance because this method creates extra unnecessary memory read and write traffic, in much the same way a write-through cache would. If data within any cacheline is modified multiple times, the data ends up being unnecessarily written to memory multiple times. Similarly, if data in different parts of a cacheline are modified, again the cacheline ends up being written to memory multiple times. And each time the cacheline is written, it may also need to be re-read for the next store. In effect, this approach may defeat the performance benefits of the cache because this approach makes the cache ineffective with regard to accelerating operations with spatial or temporal locality of access.

Methods and Apparatus of the Present Disclosure

Disclosed herein are methods and apparatuses for managing cache operations that may not suffer from the drawbacks described above. Particularly, the methods and apparatuses disclosed herein may enable cache operation management without requiring that software perform an accounting method to track which dirty cachelines need to be flushed when a particular flush set needs to be committed. Instead, this tracking of the flush set cachelines may be performed by a cache management logic, which is composed of hardware. That is, the cache management logic, which may be a circuit or otherwise be formed of circuit components, may determine an association of each cacheline to the epoch that was current at the time the cacheline was dirtied, and may insert that association into a field of the cacheline's tags. The epoch number is incremented each time a thread of execution completes a flush-barrier checkpoint. A cacheline may thus be associated with the epoch number that was currently in effect at the time that the cacheline was dirtied. An epoch may be defined as a particular period of time occurring between two consecutive flush barriers.

A flush-barrier checkpoint may be defined as a point in the execution of thread on a CPU, at which all of the cachelines in a cache or in multiple caches associated with a specified epoch number or earlier must be written-back following execution of a flush instruction before further execution of the thread is permissible. A "flush" instruction as used herein should be interpreted broadly, to include all varieties of instruction that result in the synchronous writing of a modified cacheline to memory, regardless of whether the cacheline is also invalidated, or remains valid in the cache. Thus, it should be understood that the term "flush" as used in the present disclosure also encompasses what, in many architectures, is termed a "clean" operation. Thus, a cacheline recited in the present disclosure as being "flushed" to memory is intended to mean that the cacheline is being flushed or cleaned to memory. A "flush-barrier" requirement may be defined as a requirement that dependent code must not begin to execute until all of the stores in the store set are not only visible to all threads within a coherency domain, but also committed to the physical memory.

According to an example, an epoch-specific flush instruction may be added to the instruction set of the cache management logic. Whereas a normal flush instruction acts upon a single cacheline specified by address, an epoch-specific flush instruction acts upon a specific epoch, resulting in a flush of all cachelines in all caches within the coherency domain whose epoch tags match the epoch specified in the flush instruction. The CPU thread may implement the epoch-specific flush instruction on a particular epoch, causing the cache management logic to flush to memory the particular set of modified cachelines associated with that epoch number. Thus, for instance, the cache management logic may also implement the epoch-specific flush instruction on an epoch number that is prior to a current epoch number. In any case, implementation by the CPU thread of the epoch-specific flush instruction may cause each cacheline in a cache or multiple caches having an associated epoch number that matches or is prior to the particular epoch number identified in the instruction to be written back to a memory. In addition, execution of the instruction may perform the write-back on the those cachelines without writing back cachelines in the cache(s) that either are not associated to an epoch number or have an associated epoch number that is subsequent to the particular epoch number.

Through implementation of the methods and apparatuses disclosed herein, a flash barrier's cache footprint accounting may be performed in hardware, thus allowing the performance and power benefits of the accounting method to be implemented without the code and data overhead and software complexity of doing all of the accounting in software. In this regard, software may be freed from having to keep a detailed accounting of modified cachelines when commit-to-memory barriers are required. This may improve performance and simplify programming for systems that use either non-volatile load/store memory or non-coherent shared memory between CPUs.

With reference first to FIG. 1, there is shown a simplified block diagram of a computing system 100 on which features of the methods and apparatuses disclosed herein may be implemented, according to an example. As shown in FIG. 1, the computing system 100 may include any number of coherency domains 102a-102n, in which "n" represents a variable that is equal to or greater than one. Although three coherency domains 102a-102c are depicted in FIG. 1, it should be understood that the computing system 100 may include a lesser or a greater number of coherency domains than as shown in FIG. 1. Each of the coherency domains 102a and 102b is depicted as including a respective processor 110a, 110b (which may equivalently be CPUs or CPU cores) and a dedicated cache 112a, 112b. Each of the caches 112a, 112b is also depicted as including a respective cache management logic 114a, 114b. The coherency domain 102c is depicted as including a third processor 110c having a tier 1 cache 115, a fourth processor 110d having a tier 1 cache 116, and a shared tier 2 cache 117 that is shared by both of the processors 110c, 110d. The coherency domain 102c may thus include caches 115-117 between which mutual coherence is maintained, for example, because the coherency domain 102c contains multiple processors 110c, 110d, each with multiple cache tiers 115, 116, and multiple types of cache (e.g., data and Instruction). Although not shown, each of the third and fourth processors 110c, 110d may include a respective cache management logic 114c, 114d. The depiction of multiple types of coherency domains 102a-102c in FIG. 1 is for illustrative purposes only and thus, it should be understood that the computing system 100 may include either single cache per coherency domain(s), multiple caches per coherency domain(s), or both.

The coherency domains 102a-102c are also depicted as being coupled to an interconnect 120. Also depicted as being coupled to the interconnect 120 is a memory controller 130 to which is coupled a memory 132. The interconnect 120 may be a system bus, an interconnect fabric, crossbars, point-to-point connections, or the like. The coherency domains 102a-102n may each contain any number of processors (CPUs) and any number of mutually-coherent caches.

Generally speaking, the cache management logic 114a-114n may control the caching of data into the respective caches 112a-112n, 115-117 dedicated to the respective coherency domains 102a-102n. That is, a first cache management logic 112a may control the caching of data into a first cache 112a in a first coherency domain 102a, a second cache management logic 112b may control the caching of data into a second cache 112b of a second coherency domain 102b, a third and fourth cache management logic (not depicted) associated with processors 110c and 110d control the caching of data into the caches 115-117, etc. The control of the caching of data may include determining when a cacheline is dirtied (or equivalently, modified) and marking the cacheline as such, flushing dirty cachelines from the cache 112a, cleaning dirty cachelines in the cache 112a, evicting cachelines, etc. In addition, when multiple caches are in a coherency domain, such as in coherency domain 102c, the control may include copying or moving cachelines from one cache 115 to another cache 117 within a coherency domain.

Additionally, and according to an example, the cache management logic 114a-114n may determine a current epoch number and may insert an association of the cacheline to a current epoch number into a field of the tags of the cacheline that is being dirtied as described in greater detail herein. As also discussed in greater detail herein, the epoch number may have store operations associated with it in the cache tags, and is incremented each time a thread of execution, e.g., execution of a store operation by a processor 110a-110n on a cache 112a-112n, completes a flush-barrier checkpoint. Also shown in FIG. 1 are counters 140a, 140b, 140c, etc., each of which may be associated with a respective coherency domain 102a-102n as shown in FIG. 1. Each of the counters 140a-140n may be incremented each time any thread of CPU execution in that coherency domain 102a-102n completes a flush-barrier checkpoint. In FIG. 1, the processors 110c, 110d form a single coherency domain 102c, and therefore share a single counter 140c. In one example, a cache management logic 114a may send a signal to the counter 140a each time that the counter 140a is to be incremented. In another example, the counter 140a may track when a thread of execution completes a flush-barrier checkpoint and may be incremented accordingly. In either example, each of the cache management logics 114a-n may determine the current epoch number from a respective counter 140a-140n, whenever this epoch number must be copied into a cacheline tag for purposes of associating the cacheline with the particular epoch number.

The counters 140a-140n may be software counters or hardware counters, i.e., implemented in software or in a hardware device, such as a circuit. Additionally, the counters 140a-140n may be standalone devices as shown in the coherency domain 102c, or may be part of another component, such as a cache management logic 114a, a processor 110a, as shown in the coherency domains 102a, 102b, etc.

The coherency domain 102c contains caches shared between processors 110c, 110d (which may be CPU cores) and threads running on the processors 110c, 110d. As such, a consistent interpretation of the epoch numbers in the cache tags across all of the threads running within the coherency domain 102c may be needed. The current epoch number may thus be construed as a coherency-domain-wide value that must itself be coherent across the coherency domain 102c. As such, incrementing of an epoch number by any one thread must affect the tagged epoch numbers associated with all of the subsequent stores that occur from any thread in the coherency domain 102c. The epoch numbers may be kept coherent across the coherency domain 102c through implementation of any suitable technique.

In various instances, there may be many threads running in the coherency domain 102c, each independently performing operations that require flush-barrier checkpoints. Since the threads are independent, there is no coordination or synchronization of flush-barrier events between the threads. Each such flush barrier may thus introduce a new epoch number for the entire coherency domain 102c. Thus, the current epoch number for the coherency domain 102c may increment multiple times during the time a single thread is performing the multiple store instructions that form a single flush barrier's cache footprint. Successful completion of a flush barrier by a particular thread may thus require the flushing to memory 132 of all cachelines modified by all stores that occurred in the same epoch as the most recent store belonging to the applicable flush checkpoint's footprint—as well as by all stores that occurred in earlier epochs.

As described above, features of the present disclosure may relieve software of the responsibility of doing detailed accounting for the precise list of modified cachelines. However, for each thread, either software or hardware may still keep track of which epoch number was in effect at the time of the most recent epoch-tagged store by that thread in order to specify in the epoch number in a subsequent "epoch specific flush" instruction. According to an example, the processors 110c, 110d may include a per-thread resource that records the epoch number in effect each time that thread performs any epoch-tagged store. Each subsequent store may update the per-thread resource so that the per-thread resources always reflects the epoch in effect at the time of the latest epoch-tagged store by that thread and thus the epoch number that should be used in a subsequent "epoch-specific flush instruction". In an example, the hardware that implements the epoch-specific flush instruction may implicitly use the epoch number directly from the per-thread resource, without requiring the software to specify it as an instruction parameter.

A flush-barrier checkpoint may be defined as a checkpoint that Indicates that all of the cachelines in all caches within a coherency domain associated with a specified epoch number or an epoch number that is prior to the specified epoch number have been written-back to memory following execution of an epoch-specific flush instruction. A "flush" instruction as used herein may be defined as being either a "flush" operation or a "clean" operation and thus, when a cacheline is recited as being "flushed" to memory, it should be understood that this is intended to mean that the cacheline is being flushed or cleaned to memory. A "flush-barrier" requirement may be defined to require that dependent code must not begin to execute until all of the stores in the store set are not only visible to all threads within a coherency domain, but also committed to the physical memory 132.

According to an example, each of the processors 110a-110d may execute an instruction set that includes an epoch-specific flush Instruction on the cachelines with matching epoch tags for their respective coherency domains 102a-102c. The epoch-specific flush instruction for each of the processors 110a-110d may be associated with a particular epoch number, for instance, an epoch number corresponding to a particular set of modified cachelines that is to be written to memory 132 for the cache(s) in the respective coherency domains 102a-102c. For instance, each of the processors 110a-110d may execute the epoch-specific flush instruction on cachelines that are associated with respective epoch numbers that are equal to and prior to a specified epoch number. In any case, execution by the processor 110c of the epoch-specific flush instruction may cause each cacheline in all caches 115-117 within the coherency domain 102c having an associated epoch number that matches or is prior to the particular epoch number identified in the epoch-specific flush instruction to be written back to the memory 132. In addition, execution of the epoch-specific flush instruction may cause the write-back to be performed on the those cachelines without writing back cachelines in the caches 115-117 that either are not associated to an epoch number or have an associated epoch number that is subsequent to the particular epoch number.

Figure 2:
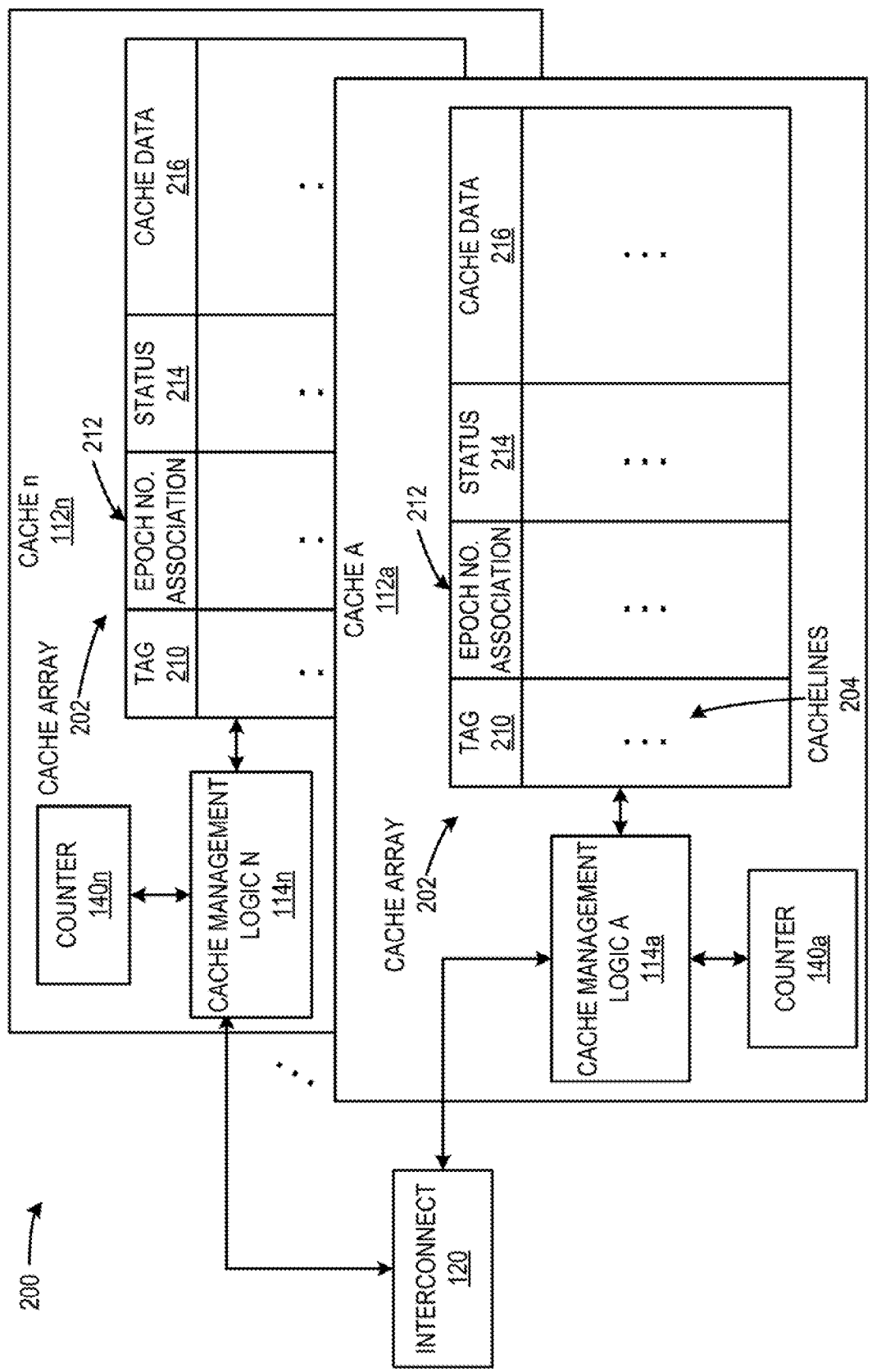
FIG. 2 shows a simplified block diagram of a plurality of caches that may implement features of the methods and apparatuses disclosed herein, according to an example of the present disclosure.

Turning now to FIG. 2, there is shown a simplified block diagram 200 of a plurality of caches 112a-112n that may implement features of the methods and apparatuses disclosed herein, according to an example. It should be noted that FIG. 2 shows a single cache 112a-112n per coherency domain. As shown, each of the caches 112a-112n may include a respective cache management logic 114a-114n as discussed above with respect to FIG. 1. Additionally, each of the caches 112a-112n may include a cache array 202 formed of a plurality of cachelines 204. As shown, each of the cachelines 204 may include a tag 210, an epoch number association 212, a status 214, and cache data 216. The tag 210 may, in combination with the cacheline index, identify an address of block of the memory 132 to which the cacheline 204 corresponds. The epoch number association 212 may identify the association of the cacheline 204 to an epoch number, in which the association is either the epoch number itself or a link field containing a pointer to a next cacheline associated with the epoch number to which the cacheline 204 is associated. The status 214 may include information to indicate whether or not the cacheline 204 is dirty (or equivalently, modified). The cache data 216 may be the payload or the actual data that is being cached from the memory 132.

According to an example, each cache management logic 114a-114n may obtain the current epoch number from the corresponding counter 140a-140n. In cases where multiple caches exist within a single coherency domain (depicted in coherency domain 102c in FIG. 1, but not shown in FIG. 2), a single counter serves the entire coherency domain. As discussed above, the counters 140a-140n may individually increment the epoch number each time a thread of execution running within its associated coherency domain 102a-102n, for instance, a thread of processor 110a-110n execution, completes a flush-barrier checkpoint. In an example, the epoch number is a modulo-N number for some value N, which is the incremented value. The increment operation may be implemented as a side-effect of the execution of an epoch-specific flush instruction or may be explicitly performed by software using a purpose-defined instruction or accessing a purpose-defined register. In any regard, there may be a finite number to which the epoch numbers may reach. For instance, if the epoch numbers are represented by an 8 bit number, then there may be 256 total numbers, and thus, after reaching 255, the epoch number may wraparound to 0. In order to ensure that when a wraparound occurs, that the epoch number 0 is correctly considered to be a later epoch number than epoch number 255, modulo-arithmetic may be used. By way of example, the cache management logic 114a-114n may ensure that an epoch number (E) is considered to be "prior-to" a specified epoch number (Es), considering a current epoch number (Ec) if:

$$((Ec-E) \text{modulo } N) > ((Ec-Es) \text{modulo } N).$$

In addition, in the 8 bit example above, in which the epoch numbers may range between 0-255, no more than 128 different epochs may be in effect at a time. In other words, prior to moving to a new epoch number, there must be no remaining dirty cachelines 204 containing an epoch field that is prior to the then-current epoch that was in effect 128 epochs ago. A mechanism may be implemented to prevent epoch numbers associated with modified cachelines 204 from becoming ambiguous due to the modulo-N wrapping around. In a first example in which software is implemented, the convention may be to explicitly issue an epoch-specific flush instruction followed by a suitable barrier instruction before incrementing the current epoch number, in cases where the current-epoch increment would otherwise wrap around to an epoch number for which there may still be epoch-tagged cachelines in the cache 112. For example, if the current epoch number is 128 plus 5 (e.g., 133), an epoch-specific flush instruction may be executed on epoch number 5 to thus prevent the wraparound problem. In a second example in which hardware is implemented, a state machine or other logic may perform the same features as discussed above with respect to the software example.

According to an example, the association of a dirty cacheline 204 to an epoch number may be selectively applied. In other words, epoch numbered tagging upon store may not be required for all stores. An epoch-tagged store may be one flavor of store (used when storing to a flush-barrier's footprint), but normal stores, which do not assign an epoch tag to a cacheline may still be performed. That is, the processor instruction set may include both epoch-numbered and non-epoch-numbered variants of the store instruction, so that the cache management logic 114a-114n may or may not associate an epoch number to a cacheline when the line is dirtied. In this regard, the epoch number association 212 for the cachelines 204 in a cache array 202 that are not associated with an epoch number may be unfilled or may otherwise contain an indication that those cachelines are not associated with any particular epoch number. For instance, all of the cachelines 204 that are known to be consistent with their backing-store memory, i.e., not dirty or modified, may not be associated with an epoch number. In addition, modified cachelines 204 may not be associated with an epoch number if they have only ever been modified by non-epochnumbered store instructions, in the interval since they were last known to be consistent with their backing-store memory. "Backing-store memory" generally refers to the line in the memory 132 to which the cacheline 204 corresponds.

Additionally, the cache management logic 114a-114n may associate cachelines 204 that were not previously associated with any epoch numbers with the epoch number in effect at the time the cachelines 204 are first modified by an epoch numbered store operation. The cache management logic 114a-114n may further maintain the associations between cachelines 204 and the epoch numbers in effect when the cachelines 204 were first modified until the cachelines 204 become consistent with their backing-store memories, e.g., due to a completed eviction writeback, explicit cache clean instruction execution, implicit writeback resulting from a snoop, etc. That is, if a dirty cacheline 204 is associated with a particular epoch number and is modified by subsequent store instructions before the dirty cacheline 204 is written back to memory 132, the cache management logic 114a-114n may not change the epoch number to which the dirty cacheline 204 is associated to the incremented epoch number. In this regard, the dirty cacheline 204 will be committed to memory 132 when a flush instruction is performed on the earlier epoch number, or when the cacheline is flushed, evicted or otherwise cleaned through any other mechanism. Additionally, it should be noted that because clean cachelines 204 are implicitly epoch-free, upon completion of an epoch-specific flush instruction, there remain no cachelines 204 in the cache hierarchy that are associated with the particular epoch number that was written back.

A "memory store barrier" instruction may be added to the instruction set of the cache management logic 114a-114n. When executed, the memory store barrier instruction may block subsequent epoch-tagged stores from being executed until the memory store barrier is satisfied, but may allow other instructions including non-epoch-tagged stores to be executed. When used following with an epoch-specific flush instruction, the memory store barrier instruction may allow independent code to continue running, yet blocks code that depends upon prior flush-barrier checkpoint completion. In one regard, execution of the memory store barrier instruction may be a better performance alternative to the use of a full memory barrier, for instance, in cases when a flush barrier is only being used as a store-ordering checkpoint.

Just as a normal flush instruction flushes dirty data from all caches in a coherency domain, so too must an epoch-specific flush. An extension may be made to the protocol layer used within a coherence domain, to allow the epoch-specific flush instruction to be signaled to all of the caches 115-117 within a coherency domain 102c. The protocol layer refers to whatever communication medium, such as busses or fabric delivers, messages between processors 110c, 110d, which may be CPU cores, and caches 115-117 within the coherency domain 102c. In one example, a processor 110c (e.g., a CPU core) may communicate a signal across the protocol layer to various caches 115-117 in the coherency domain 102c to execute an epoch-specific flush instruction on the caches 115-117. In other words, the extension to the protocol layer may allow the signaling of flush-by-epoch semantics to all of the caches 115-117. In this regard, if a dirty cacheline 204 associated with a particular epoch number has moved from one cache 115 to another cache 117 in the coherency domain 102c, that dirty cacheline 204 may still be flushed or cleaned through execution of the epoch-specific flush instruction across the caches 115-117.

Another extension to the protocol layer may be made such that when an epoch-tagged cacheline writeback or cache-to-cache copy occurs, whether due to eviction, snoop, or cache-clean instruction, the epoch number associated with that cacheline 204 accompanies the cacheline 204 writeback request on the interconnect 120, e.g., external bus, fabric, etc. Maintaining the epoch number association may allow external components, such as external caches, home agents, memory controllers, etc., to implement epoch-specific fence behaviors. Since epoch-number sequences are associated with individual coherency domains 102a-102n, any epoch-specific handling by external components must identify epochs using the tuple of epoch number and coherency-domain identification.

An extension to the external protocol layer may be made such that when an epoch-specific flush instruction is executed, an external message identifying the cleaned or flushed epoch and the current epoch may be issued to the fabric following the final writeback resulting from execution of the epoch-specific flush instruction. External hardware in the memory interface may not signal a completion response to this message until all matching or earlier epoch outstanding writebacks from that coherency domain have been completed. External memory interface hardware may optimize write latency by posting writebacks under normal circumstances, provided the external memory interface hardware does not post these epoch-specific flush instruction notifications, and does not retire them until all of the same-or-earlier epoch writes from the same coherency domain have become persistent and/or globally visible as required.

In other words, a new type of message may be defined that goes out on the external protocol to all of the components that the cachelines 204 that are being written to memory 132 may touch and the new type of message may thus follow the same path as the writes. The message may indicate that an epoch-specific flush instruction is being executed on a particular epoch number on behalf of a particular coherency domain, and to send back a response message when all of the writes for the cachelines 204 associated with that particular epoch number from that coherency domain have been completed. The term "completed" may mean persistent in non-volatile memory, visible to reads from other coherency domains, or both, depending upon the architectural needs of the design. In one regard, because this new message follows the cachelines 204 that are being written into memory 132, the new message is forwarded after all of the cachelines 204 associated with the particular epoch number have been forwarded, the memory controller 130 may not send back the response message until after all of the cachelines 204 have been committed to memory 132. In one regard, therefore, instead of sending a completion message to every single write one at a time, the memory controller 130 may send one completion response message corresponding to one flush-barrier, which implicitly acknowledges that all of the same or earlier epoch writes that were sent ahead of the new type of message have been committed to memory 132.

According to an example, the cache management logics in the caches 115-117 that comprise a coherency domain may maintain the epoch number association 212 of the cachelines 204 when the cachelines 204 are passed between caches 115-117. Thus, for instance, when responding to a cacheline snoop of a cacheline 204 associated with an epoch number, the associated epoch information 212 in that cacheline 204 may not be lost. In other words, when a cacheline 204 is passed between caches 115-117 in a cache-to-cache copy snoop response, the epoch number association 212 of the cacheline 204 may be preserved. Alternatively, the cache management logics in the caches 115-117 may implicitly also writeback dirty cachelines 204 that are being snooped. In this example, the cachelines 204 may become non-epoch tagged when they are copied from one cache to another, since the modified data is once again consistent with the value in backing-store memory.

The epoch number associations 212 stored in the caches 112a-112n may be used to enhance the selection of cachelines for eviction. When selecting a cacheline 204 from a set for pressure eviction, e.g., to make room for a new cacheline, preference may be given to the cachelines 204 that are associated with older epoch numbers. The cache management logics 114a-114n may implement this example with other schemes to select cachelines 204 for eviction, such as least recently used (LRU) and not recently used (NRU) schemes.

As discussed above, the epoch number association 212 of a cacheline 204 may either be the epoch number to which the cacheline 204 is associated or a link field containing a pointer to a next cacheline associated with the epoch number to which the cacheline 204 is associated. In the latter example, the link field may be used to construct a linked-list linking all of the same epoch entries. Epoch-specific cacheline may thus be easily located for writing back in response to an epoch-specific flush instruction. In this example, each time a cacheline 204 is newly associated with a specific epoch, the cacheline 204 may be appended to the linked-list corresponding to that specific epoch. For instance, the epoch number association 212 of the cacheline 204 may contain the way and index number of the previously appended cacheline 204 in the same linked list. In one regard, through use of the linked list, all of the cachelines 204 associated with a particular epoch number may be easily identified and flushed or cleaned when an epoch-specific flush instruction is executed on the particular epoch number.

In various instances, only a single cacheline 204 that is associated with a linked list corresponding to an epoch number is removed from a cache 112a, such as when the cacheline 204 is snooped-out for a cache-to-cache copy, explicitly flushed by a cache-management instruction, evicted, etc. In these instances, unless the cacheline 204 is at the head of the linked list, removal of the cacheline 204 results in the linked list being broken. This issue may be resolved through any of the following techniques. Initially, a standard linked-list surgery technique may be used, such as a forwards/backwards doubly-linked list and the cross-linking of the predecessor and successor cachelines in the chain to each other. Secondly, if the purpose of the removal is an eviction, the selection of the cacheline 204 to be evicted may be biased towards non-epoch-tagged cachelines within the set needing eviction, or towards head-of-linked-list cachelines, in order to reduce the frequency of costly linked-list surgery.

Figure 3:
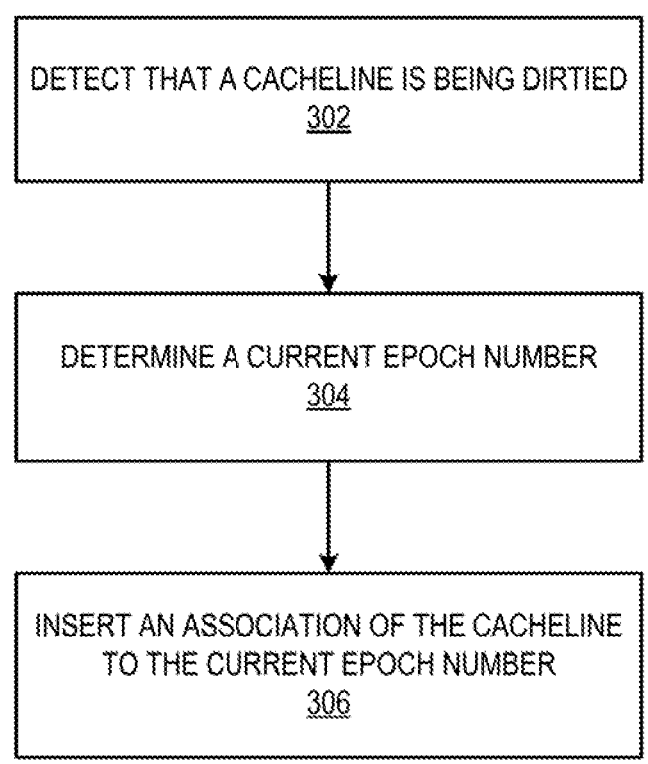
FIG. 3 shows a flow diagram of a method for managing cache operations using epochs, according to an example of the present disclosure.
Figure 4A:
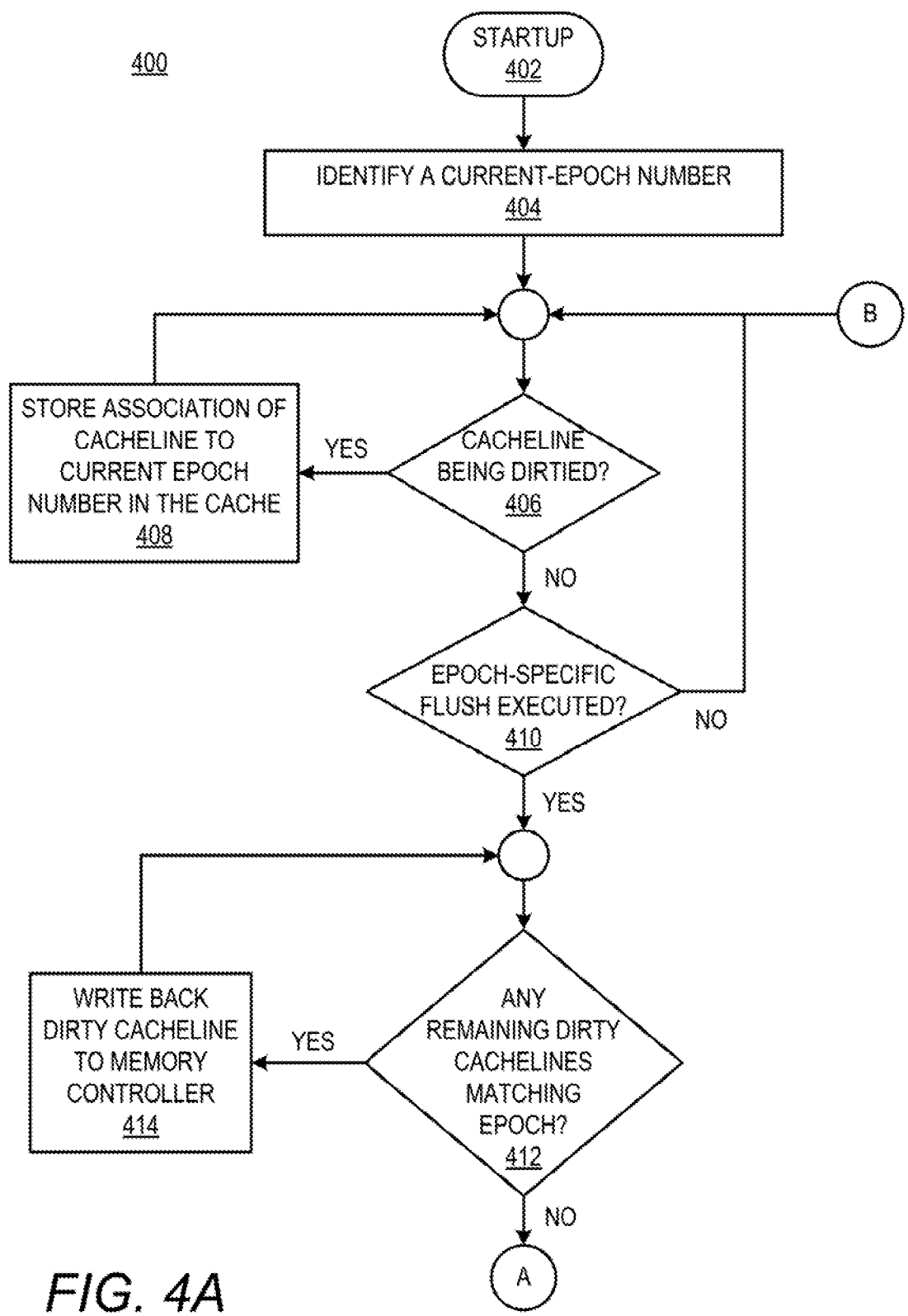
FIGS. 4A and 4B, collectively, show a flow diagram of a method for managing cache operations using epochs, according to another example of the present disclosure.
Figure 4B:
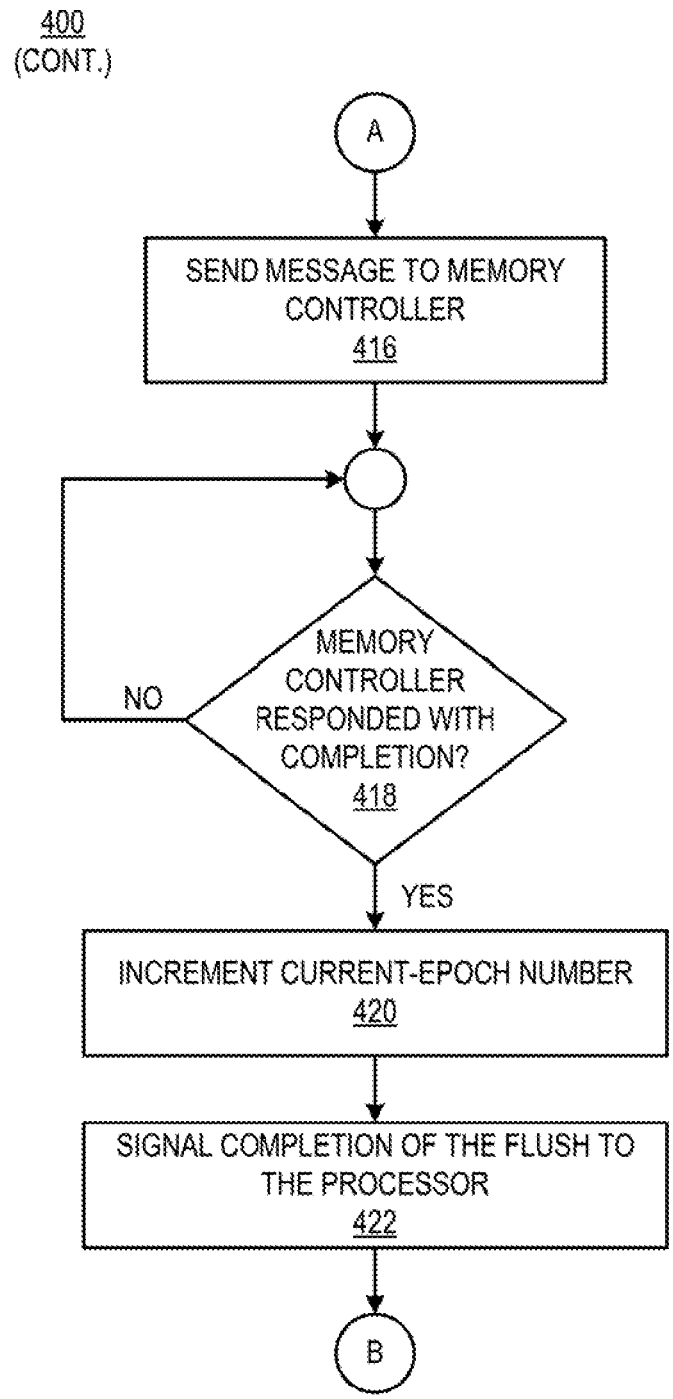

With reference now to FIGS. 3 and 4A-4B, there are respectively shown flow diagrams of methods 300 and 400 for managing cache operations using epochs, according to two examples. It should be understood that the methods 300 and 400 depicted in FIGS. 3 and 4A-4B may include additional operations and that some of the operations described therein may be removed and/or modified without departing from the scopes of the methods 300 and 400. The descriptions of the methods 300 and 400 are made with reference to the features depicted in FIGS. 1 and 2 for purposes of illustration and thus, it should be understood that the methods 300 and 400 may be implemented in apparatuses having architectures different from those shown in FIGS. 1 and 2. In addition, although particular reference is made to a single cache management logic 114a, it should be understood that the features described with respect to the methods 300 and 400 may equally be applied to the other cache management logics 114b-114n. According an example, a cache management logic 114a may implement either or both of the methods 300 and 400 as part of an epoch-specific flush behavior of the cache management logic 114a.

With reference first to FIG. 3, at block 302, a cache management logic 114a may detect that a cacheline 204 in a cache 112a is being dirtied. At block 304, the cache management logic 114a may determine a current epoch number, in which the current epoch number is associated with a store operation and in which the epoch number is incremented each time a thread of execution completes a flush-barrier checkpoint. As discussed above, a flush-barrier checkpoint may be defined as a checkpoint that indicates that all of the cachelines 204 in a cache 112a or in multiple caches 112a-112n associated with a specified epoch number or prior to the specific epoch number have been written-back to memory following execution of an epoch-specific flush instruction. At block 306, the cache management logic 114a may insert an association of the dirtied cacheline to the current epoch number into a field 212 of the cache line 204 that is being dirtied. As also discussed above, the epoch number association 212 may either be the current epoch number itself or a link field containing a pointer to a next cacheline associated with the epoch number to which the cacheline 204 is associated.

Turning now to FIGS. 4A-4B, at block 402, the method 400 may be started. Although particular reference is made with respect to a cache management logic 114a implementing the features of the method 400, it should be understood that the other cache management logics 114b-114n may also implement those features without departing from a scope of this method 400.

At block 404, a current-epoch number may be identified. For instance, the cache management logic 114a may obtain the current-epoch number from the counter 140a or in any of the other manners described above. At block 406, the cache management logic 114a may determine whether a cacheline is being dirtied. In response to a determination that a cacheline 204 is being dirtied, the cache management logic 114a may associate the dirtied cacheline 204 to the current-epoch number, as indicated at block 408. For instance, the cache management logic 114a may implement the method 300 to associate the dirtied cacheline 204 to the current-epoch number as described above with respect to FIG. 3. The current-epoch number may be the epoch number stored at block 404 and is in effect at the time the cacheline 204 is determined to be dirtied. As discussed above, various steps may be taken to enable the use of a finite number of epoch numbers.

Following block 408, the cache management logic 114a may determine whether a cacheline is being dirtied at block 406. In addition, the cache management logic 114a may repeat blocks 406 and 408 until the cache management logic 114a determines that a cacheline is not being dirtied at block 406. In response to a determination that a cacheline is not being dirtied at block 406, the cache management logic 114a may determine whether an epoch-specific flush has been executed, as indicated at block 410. In response to a determination that an epoch-specific flush has not been executed, the cache management logic 114a may repeat blocks 406-410 until a determination is made that an epoch-specific flush has been executed.

In response to a determination that an epochspecific flush has been executed at block 410, at block 412, the cache management logic 114a may determine whether there are any remaining dirty cachelines that match the epoch used in the epoch-specific flush executed at block 410. As discussed above, an epoch-specific flush instruction may be executed to cause the cache management logic 114a to write back to the memory 132 each of the cachelines 204 in the cache 112a having an associated epoch number that matches or is prior to the particular epoch number identified in the epoch-specific flush Instruction. However, the cachelines 204 in the cache 112a that either are not associated to an epoch number or have an associated epoch number that is subsequent to the particular epoch number identified in the epoch-specific flush instruction are not written back to the memory 132. As discussed above, the epoch-specific flush instruction may result in the flushing of a plurality of caches in a coherency domain 102c. Thus, an epoch-specific flush executed on processors 110c or 110d in coherency domain 102c will cause all of the cachelines 204 in the caches 115-117 associated with the particular epoch number to be flushed or cleaned.

In response to a determination that there is a remaining dirty cacheline matching the epoch, the cache management logic 114a may write-back the dirty cacheline to a memory controller 130, as indicated at block 414. In addition, the cache management logic 114a may repeat blocks 412 and 414 until the cache management logic 114a determines that there are no remaining dirty cachelines matching the epoch. Following the "A" circle from FIG. 4A to FIG. 4B, in response to the "no" condition at block 414, the cache management logic 114a may send a message to the memory controller 130, as indicated at block 416. The message may include an indication that all of the dirty cachelines matching the epoch have been sent to the memory controller 130. The cache management logic 114a may thus send the message to the memory controller 130 following execution of the epoch-specific flush instruction. As discussed above, the message may be sent following the communication of all of the cachelines 204 associated with the particular epoch number identified in the epoch-specific flush Instruction instruction to the memory 132. Thus, the memory controller 130 may receive the message after all of the cachelines 204 that are part of the particular epoch number have been received by the memory controller 130. The memory controller 130 may send a completion message back to the relevant cache management logic indicating when all of these writes have been committed to memory 132.

At block 418, the cache management logic 114a may determine whether the memory controller 130 responded with a completion message. The completion message may indicate that the writing of the cachelines 204 that are part of the particular epoch number has been completed, i.e., that a flush-barrier checkpoint has been completed. In response to a determination that the memory controller 130 has not responded with a completion message, the cache management logic 114a may wait until the completion message is received from the memory controller 130. Following receipt of the completion message, at block 420, the cache management logic 114a may increment the current-epoch number counter 140a. In addition, the cache management logic 114a may signal the completion of the flush instruction to the processor 112a, as indicated at block 422.

Following the "B" circle from FIG. 4B to FIG. 4A, the method 400 may continue at block 406 for the incremented current-epoch number counter.

Through implementation of the methods 300 and 400, a flush barrier's cache footprint accounting may be performed in hardware, e.g., a cache management logic 114a, thus allowing the performance and power benefits of an accounting method to be implemented without the code and data overhead and software complexity of doing all of the accounting in software. In this regard, software may be freed from having to keep a detailed accounting of modified cachelines 204 when commitment-to-memory barriers are required. This may improve performance and simplify programming for systems that use either non-volatile load/store memory or non-coherent shared memory between CPUs.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for managing cache operations, said method comprising:
  detecting that a cacheline in a cache is being dirtied;
  determining a current epoch number, wherein the current epoch number is associated with a store operation and wherein the epoch number is incremented each time a thread of execution completes a flush-barrier checkpoint, wherein the flush-barrier checkpoint comprises a point in an execution of the thread at which all of the cachelines in the cache associated with a specific epoch number or an epoch number earlier than the specific epoch number must be written-back to memory following execution of a flush instruction before further execution of the thread is permissible, and wherein the flush-barrier checkpoint enforces a flush barrier such that the cachelines associated with the specific epoch number or an epoch number earlier than the specific epoch number are visible to all threads of execution running in all coherency domains that share the memory;
  in response to determining that the cacheline is modified by an epoch-numbered store instruction, inserting, by a cache management logic, an association of the cacheline to the current epoch number into a field of the cacheline that is being dirtied; and
  in response to determining that the cacheline is modified by a non-epoch-numbered store instruction, inserting, by the cache management logic, an indication that the cacheline is not associated with any epoch number into the field of the cacheline that is being dirtied.

2. The method according to claim 1, further comprising:
  executing an epoch-specific flush instruction on a processor, wherein the epoch-specific flush instruction includes an identification of a particular epoch number, and wherein execution of the epoch-specific flush instruction causes each cacheline in the cache having an associated epoch number that matches or is prior to the particular epoch number to be written back to a memory.

3. The method according to claim 2, wherein execution of the epoch-specific flush instruction is completed when all of the write-backs of the cachelines associated with epoch numbers that match or are prior to the particular epoch number have been committed to the memory.

4. The method according to claim 2, further comprising:
sending a snoop or a probe message to another cache across a protocol layer, wherein the snoop or probe message is to cause a cache management logic in the another cache to perform the epoch-specific flush behavior on cachelines in the another cache having an associated epoch number that matches or falls below the particular epoch number to be written back to a memory.

5. The method according to claim 2, further comprising:
sending a message identifying the particular epoch number to a memory controller of the memory following execution of the epoch-specific flush instruction, wherein the memory controller is to return a completion message responsive to receipt of the message following a final writeback of the cachelines having an associated epoch number that matches or is prior to the particular epoch number to the memory.

6. The method according to claim 1, further comprising:
identifying the current epoch number associated with a coherency domain; and
incrementing the current epoch number following completion of a flush-barrier checkpoint by a thread of execution in that coherency domain.

7. The method according to claim 1, further comprising:
determining that the dirtied cacheline is modified prior to being written back to the memory and that the current epoch number has been incremented to an incremented epoch number;
maintaining the dirtied cacheline in association with the current epoch number following the modification of the dirtied cacheline, wherein the dirtied cacheline remains associated with the current epoch number following the current epoch number being incremented.

8. The method according to claim 1, further comprising:
transferring the cacheline to another cache in a coherency domain while maintaining the association of the current epoch number to the cacheline in the field of the cacheline.

9. The method according to claim 1, wherein inserting the association of the current epoch number to the cacheline into the field of the cacheline further comprises one of:
inserting the current epoch number into the field of the cacheline; and
inserting a link field in the field of the cacheline, wherein the link field includes a pointer to a next cacheline associated with the current epoch number, such that the cacheline is part of a linked list of cachelines associated with the current epoch number.

10. A cache comprising:
a cache array on which is stored a plurality of cachelines; and
cache management logic that is to control management of the plurality of cachelines, wherein the cache management logic is to:
detect that a cacheline in the cache array is being dirtied;
determine a current epoch number, wherein the current epoch number is associated with a store operation and wherein the epoch number is incremented each time a thread of execution completes a flush-barrier checkpoint, wherein the flush-barrier checkpoint comprises a point in an execution of the thread at which all of the cachelines in the cache associated with a specific epoch number or an epoch number earlier than the specific epoch number must be written-back to memory following execution of a flush instruction before further execution of the thread is permissible, and wherein the flush-barrier checkpoint enforces a flush barrier such that the cachelines associated with the specific epoch number or an epoch number earlier than the specific epoch number are visible to all threads of execution running in all coherency domains that share the memory;
in response to determining that the cacheline is modified by an epoch-numbered store instruction, insert an association of the cacheline that is being dirtied to the current epoch number into a field of the cacheline; and
in response to determining that the cacheline is modified by a non-epoch-numbered store instruction, insert an indication that the cacheline is not associated with any epoch number into the field of the cacheline that is being dirtied.

11. The cache according to claim 10, wherein the cache management logic is further to perform an epoch-specific flush behavior, wherein the epoch-specific flush behavior includes an identification of a particular epoch number, and wherein performance of the epoch-specific flush behavior causes each cacheline in the cache array having an associated epoch number that matches or is prior to the particular epoch number to be written back to a memory.

12. The cache according to claim 11, wherein the cache management logic is further to send a snoop or a probe message to another cache across a protocol layer, wherein the snoop or probe message is to cause a cache management logic in the another cache to perform the epoch-specific flush behavior on cachelines in the another cache having an associated epoch number that matches or falls below the particular epoch number to be written back to a memory.

13. The cache according to claim 11, wherein the cache management logic is further to send a message identifying the particular epoch number to a memory controller following execution of an epoch-specific flush instruction, wherein the memory controller is to return a completion message responsive to receipt of the message following a final writeback of the cachelines having an associated epoch number that matches or is prior to the particular epoch number to the memory.

14. The cache according to claim 11, wherein, to insert the association of the current epoch number to the cacheline that is being dirtied into the field of the cacheline, the cache management logic is further to one of:
insert the current epoch number into the field of the cacheline that is being dirtied; and
insert a link field in the field of the cacheline that is being dirtied, wherein the link field includes a pointer to a next cacheline associated with the current epoch number, such that the cacheline that is being dirtied is part of a linked list of cachelines associated with the current epoch number.

15. A method for managing cache operations using epochs, said method comprising:
determining a current epoch number, wherein the current epoch number is associated with a store operation and wherein the epoch number is incremented each time a thread of execution completes a flush-barrier checkpoint, wherein the flush-barrier checkpoint comprises a point in an execution of a thread at which all of the cachelines in a cache associated with a specific epoch number or an epoch number earlier than the specific epoch number must be written-back to memory following execution of a flush instruction before further execution of the thread is permissible, and wherein the flush-barrier checkpoint enforces a flush barrier such that the cachelines associated with the specific epoch number or an epoch number earlier than the specific epoch number are visible to all threads of execution running in all coherency domains that share the memory;

in response to determining that a cacheline is modified by an epoch-numbered store instruction, inserting an association of the current epoch number to a cacheline into a field of the cacheline that is being modified;

in response to determining that the cacheline is modified by a non-epoch-numbered store instruction, inserting an indication that the cacheline is not associated with any epoch number into the field of the cacheline that is being modified;

executing an epoch-specific flush instruction, wherein execution of the epoch-specific flush instruction causes each cacheline having an associated epoch number that matches or falls below the particular epoch number to be written back to a memory;

sending a message identifying the particular epoch number to a memory controller following execution of the epoch-specific flush instruction; and incrementing the current epoch number in response to receipt of response message from the memory controller to the external message.

16. The method according to claim 15, further comprising:

sending a snoop or a probe message to another cache across a protocol layer, wherein the snoop or probe message is to cause a cache management logic in the another cache to perform the epoch-specific flush behavior on cachelines in the another cache having an associated epoch number that matches or falls below the particular epoch number to be written back to a memory.

17. The method according to claim 15, further comprising:

identifying the current epoch number associated with a coherency domain; and incrementing the current epoch number following completion of a flush-barrier checkpoint by a thread of execution in that coherency domain.

18. The method according to claim 15, further comprising:

determining that the cacheline is modified prior to being written back to the memory and that the current epoch number has been incremented to an incremented epoch number;

maintaining the cacheline in association with the current epoch number following the modification of the cacheline, wherein the cacheline remains associated with the current epoch number following the current epoch number being incremented.

19. The method according to claim 15, further comprising:

transferring the cacheline to another cache in a coherency domain while maintaining the association of the current epoch number to the cacheline in the field of the cacheline.

20. The method according to claim 15, wherein inserting the association of the current epoch number to the cacheline into the field of the cacheline further comprises one of:

inserting the current epoch number into the field of the cacheline; and inserting a link field in the field of the cacheline, wherein the link field includes a pointer to a next cacheline associated with the current epoch number, such that the cacheline is part of a linked list of cachelines associated with the current epoch number.

* * * * *